Figure 1:
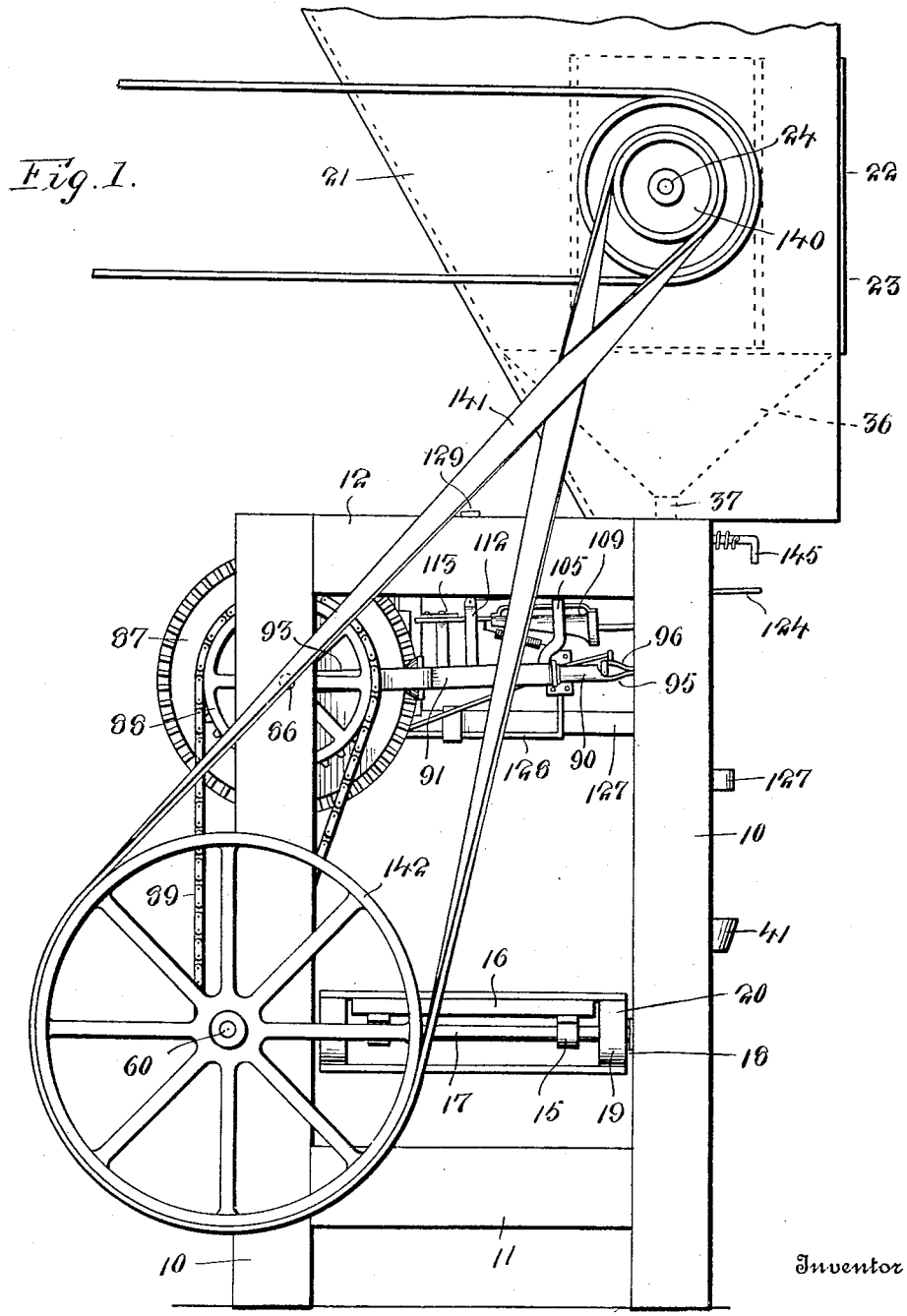

F. GRIFFEN.
SACKING MACHINE.
APPLICATION FILED FEB. 4, 1914.

1,119,693.

Patented Dec. 1, 1914.
9 SHEETS—SHEET 5.

Inventor
Frank Griffen
By Victor J. Evans
Attorney

Witnesses

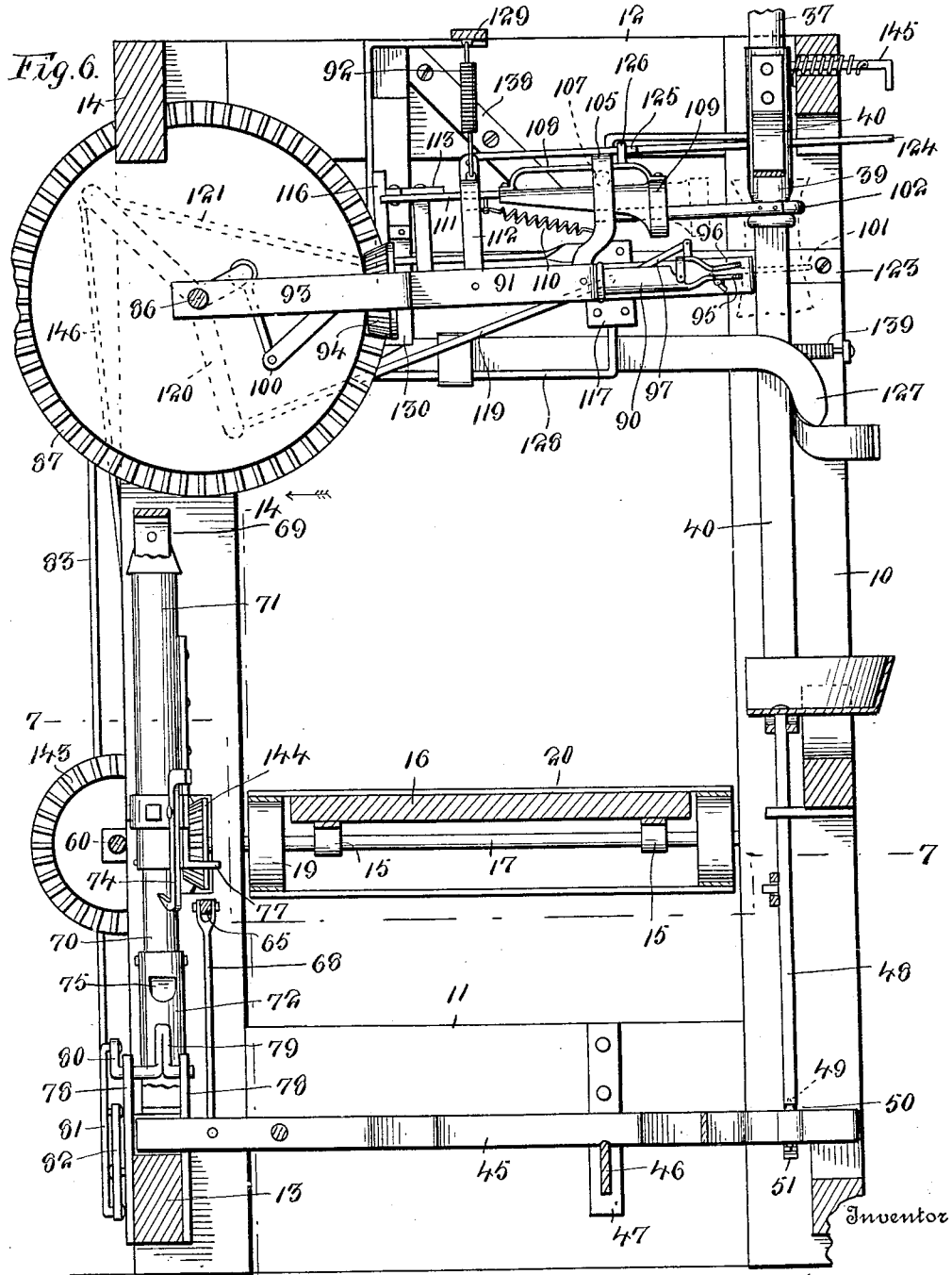

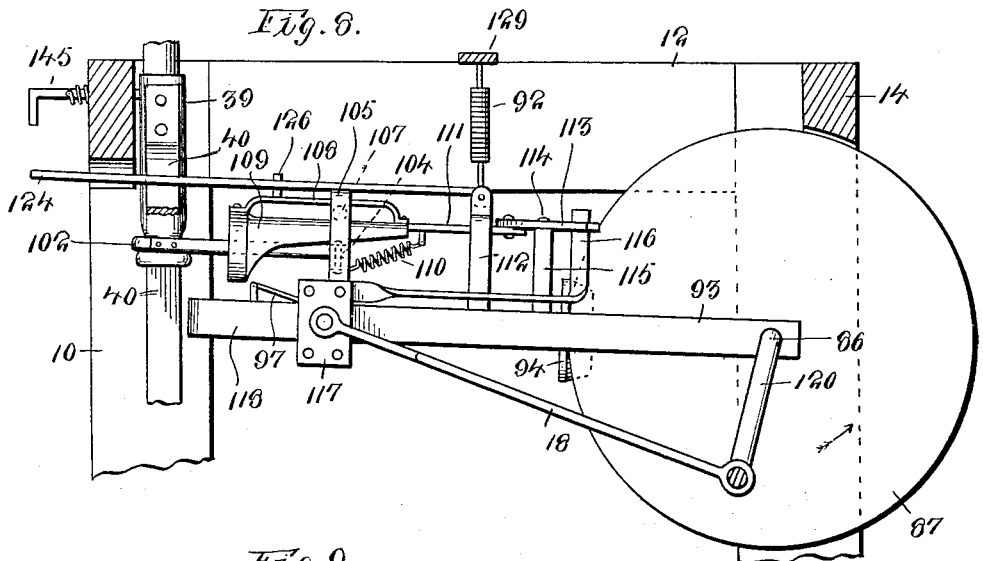
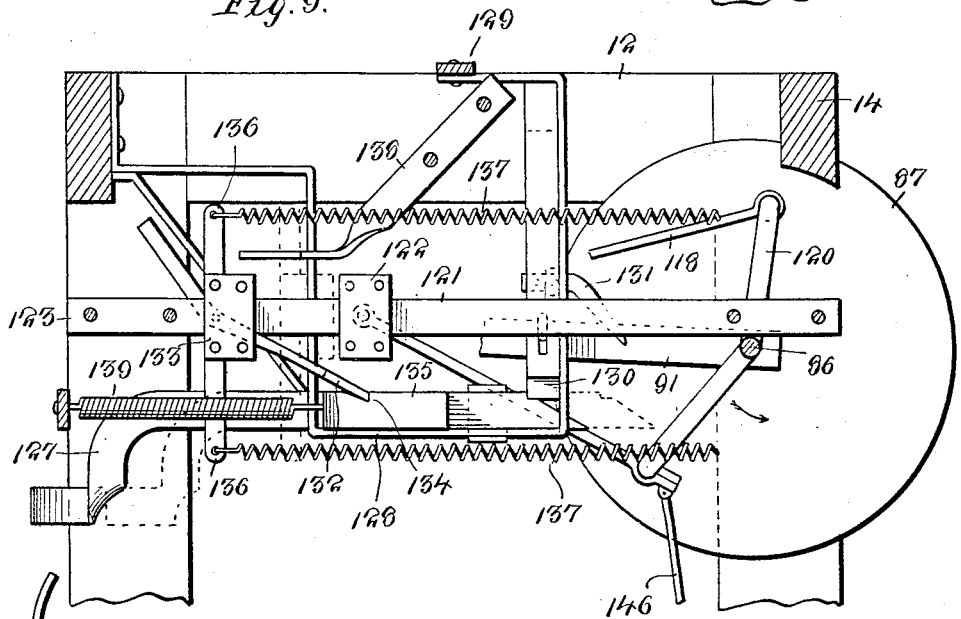

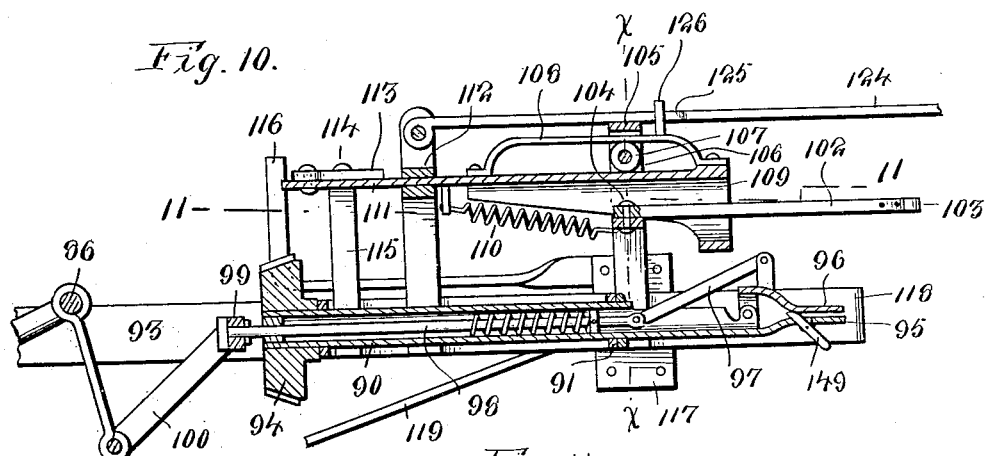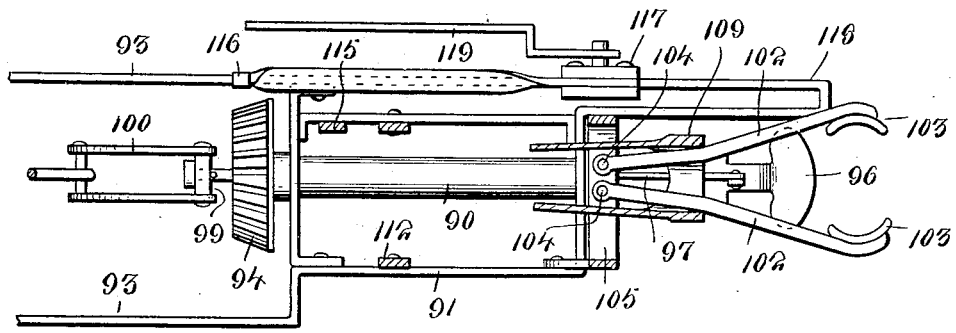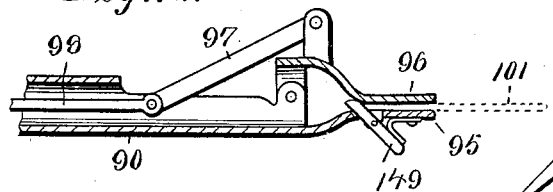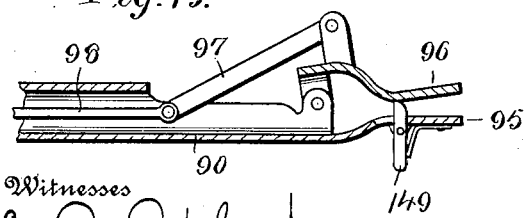

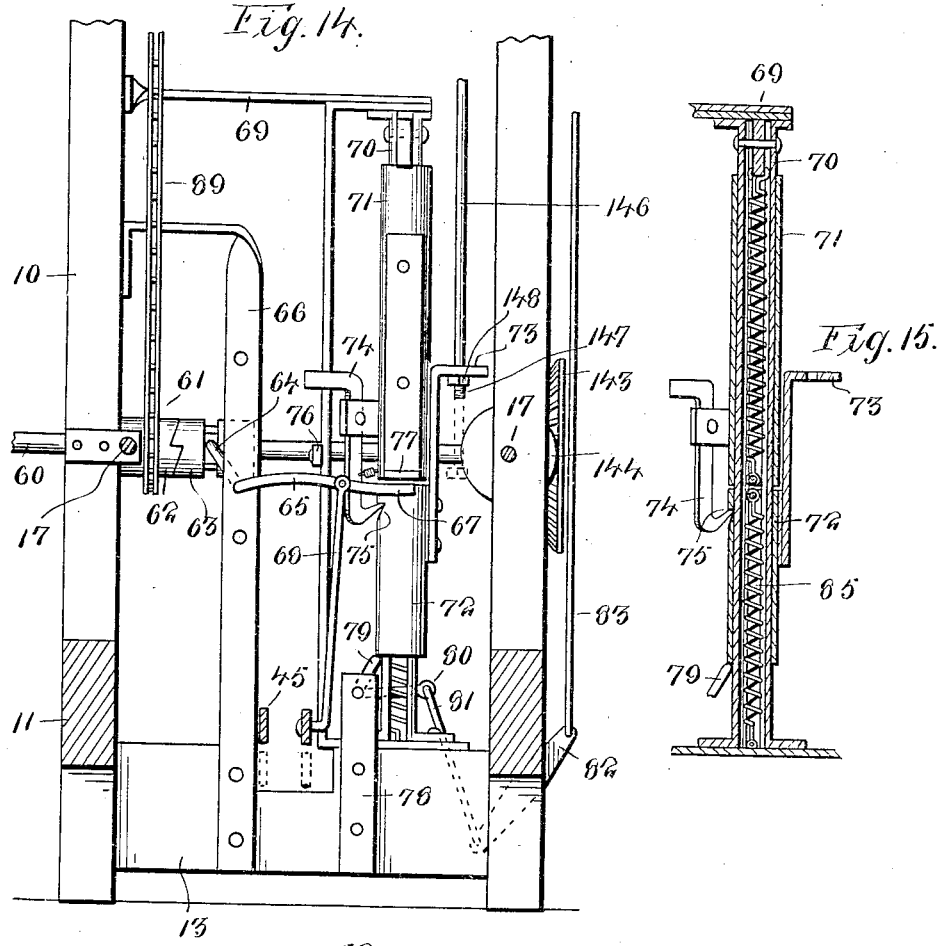

UNITED STATES PATENT OFFICE.

FRANK GRIFFEN, OF METALINE FALLS, WASHINGTON, ASSIGNOR OF ONE-HALF TO OSCAR C. WANGEMAN, OF METALINE FALLS, WASHINGTON.

SACKING-MACHINE.

1,119,693.  Specification of Letters Patent.  Patented Dec. 1, 1914.

Application filed February 4, 1914. Serial No. 816,427.

*To all whom it may concern:*

Be it known that I, FRANK GRIFFEN, a citizen of the United States, residing at Metaline Falls, in the county of Pend Oreille and State of Washington, have invented new and useful Improvements in Sacking-Machines, of which the following is a specification.

The invention relates to an automatic sacking machine, and more particularly to the class of automatic bag filling, weighing and tying machines.

The primary object of the invention is the provision of a machine of this character wherein cement or the like will be fed to a sack or bag for the automatic filling thereof, the material being weighed, the sack tied and automatically dumped onto a conveyer for the delivery thereof from the machine in a single operation of the same, thereby avoiding the employment of laborers for the hand filling, weighing and tying of the bags.

Another object of the invention is the provision of a machine of this character wherein the steps thereof are continuous while the machine is in action, thus avoiding the necessity of the stopping of the machine after the filling of the bags, the weighing of the material, and the tying of the same.

A further object of the invention is the provision of a machine of this character wherein the material when weighed within the sacks will cause the automatic stopping of the feed of the material to the sack, and thereafter the tying of the sack is automatically effected and the said sack dumped onto a conveyer for the delivery thereof from the machine, the mechanisms of the machine being of novel construction and operating successively in their respective order for the continuous working of the machine.

A still further object of the invention is the provision of a machine of this character wherein each sack or bag will be filled and dumped from its filling position with a predetermined quantity of material and the same tied and thereafter delivered from the machine.

A still further object of the invention is the provision of a machine of this character which is simple in construction, automatic in action, thoroughly reliable and efficient in operation, and inexpensive in manufacture.

Other objects will be in part obvious and in part hereinafter pointed out.

The invention accordingly consists in the construction, combination and arrangement of elements which will be exemplified in the construction set forth and the scope of the application of which will be indicated in the following claims.

Figure 2:
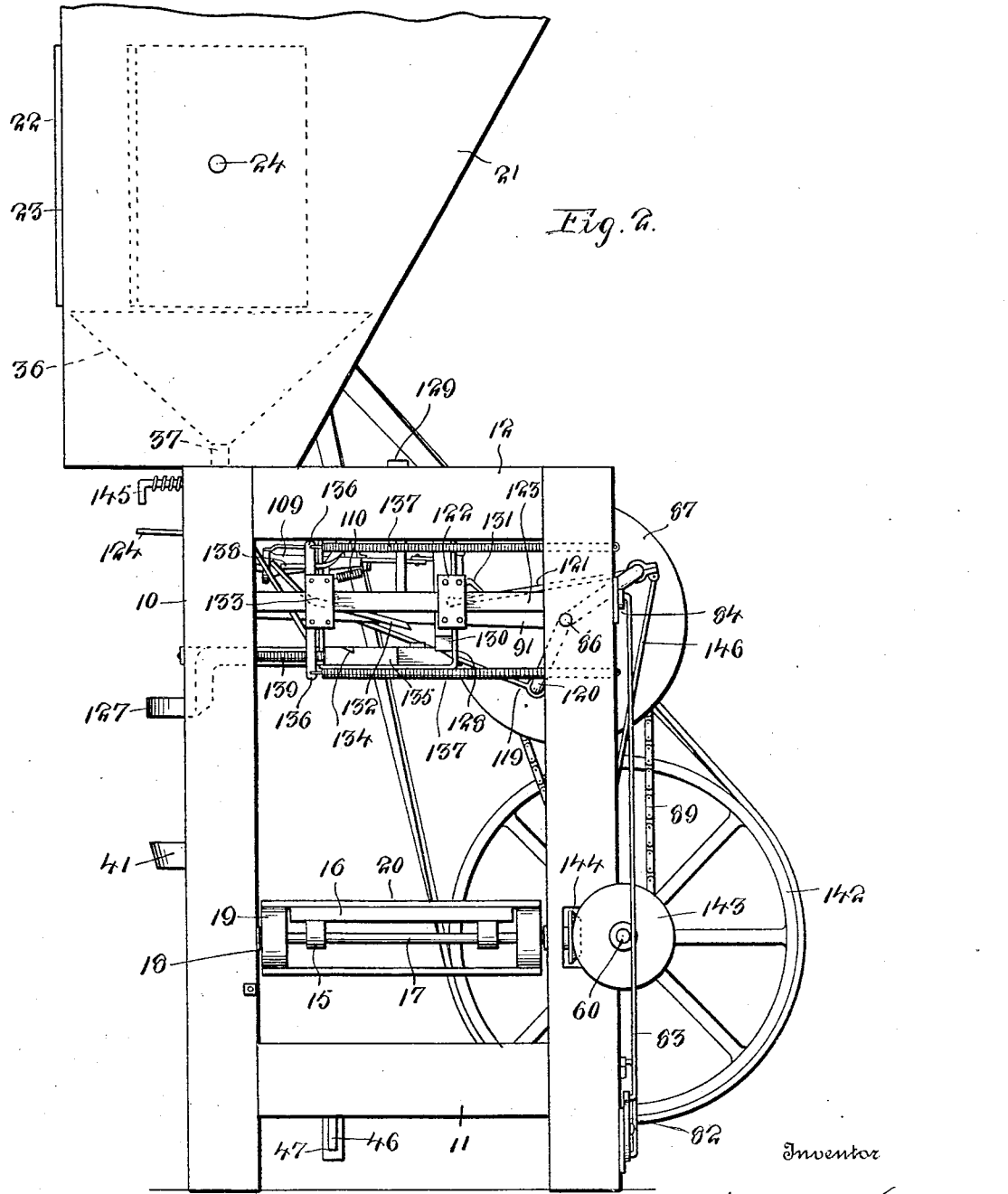
Figure 3:
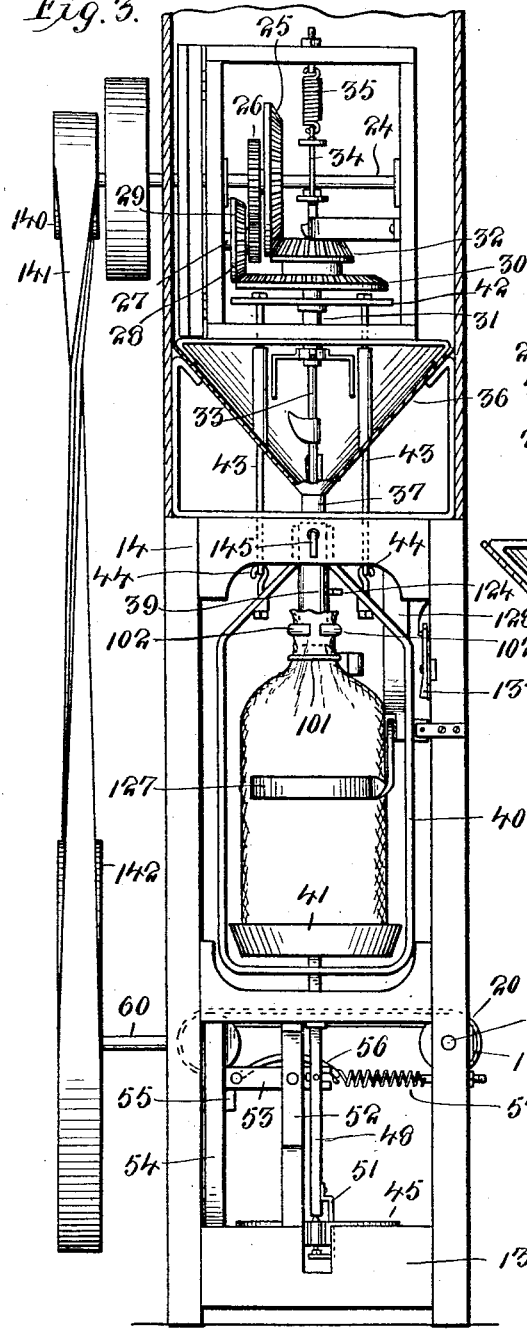
Figure 4:
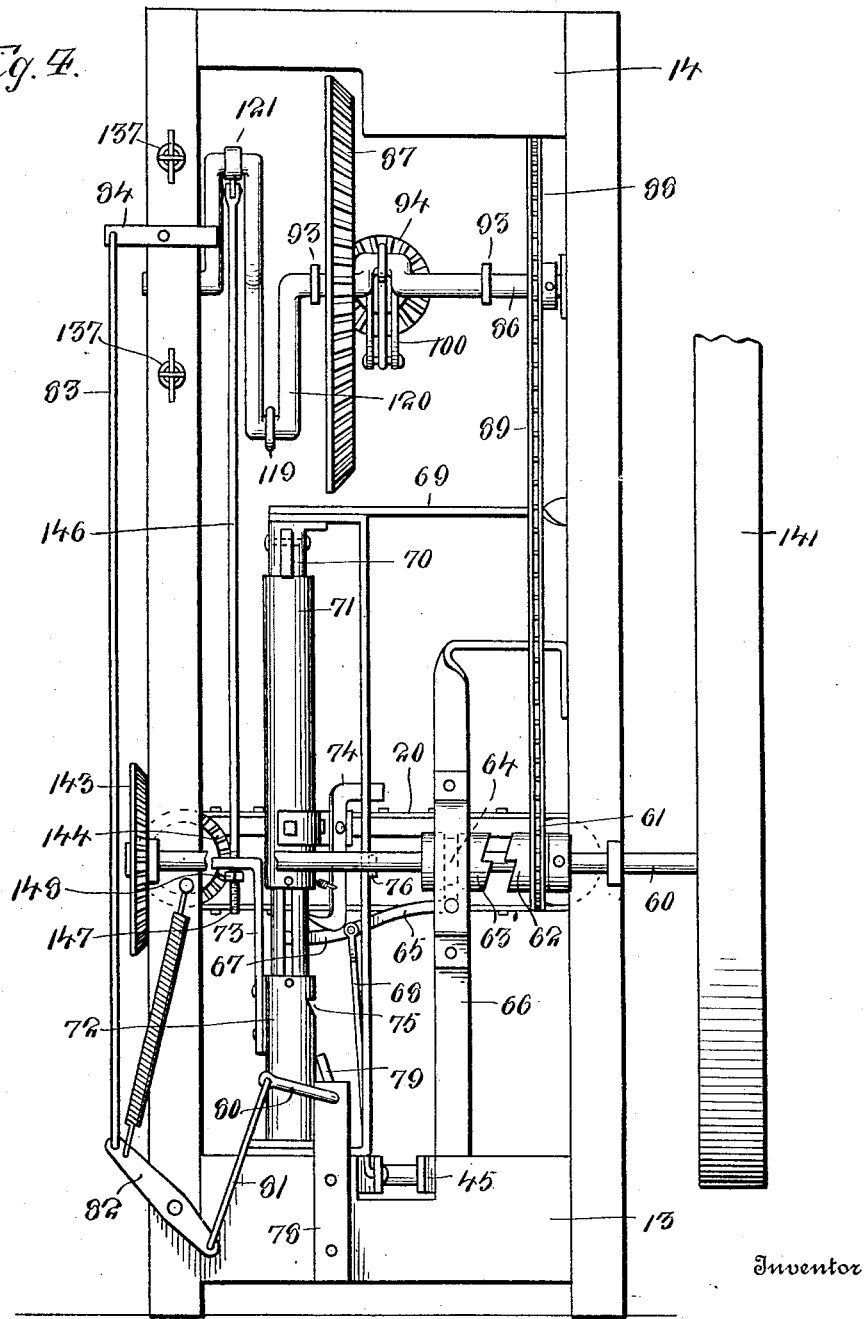
Figure 5:
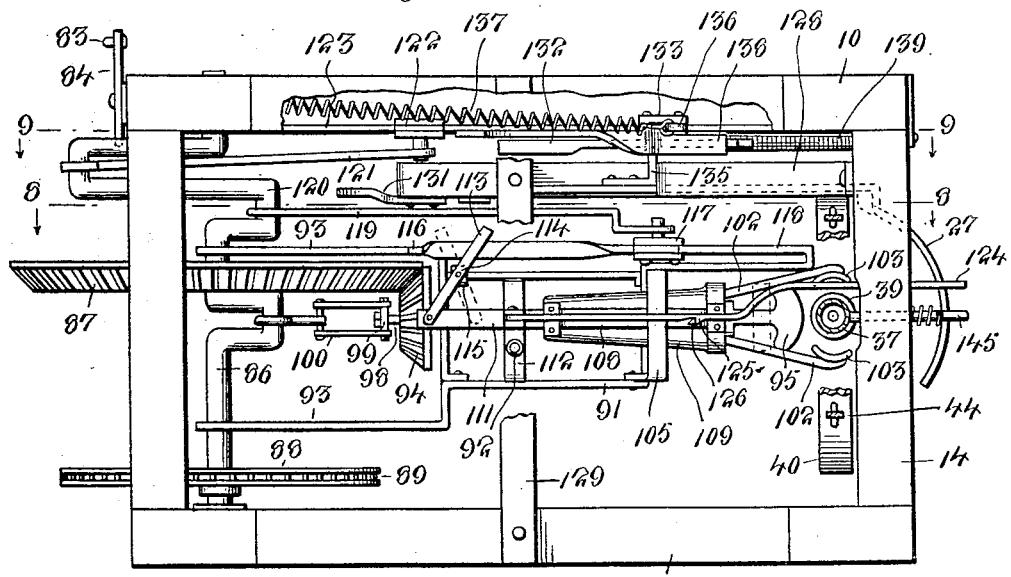
Figure 7:
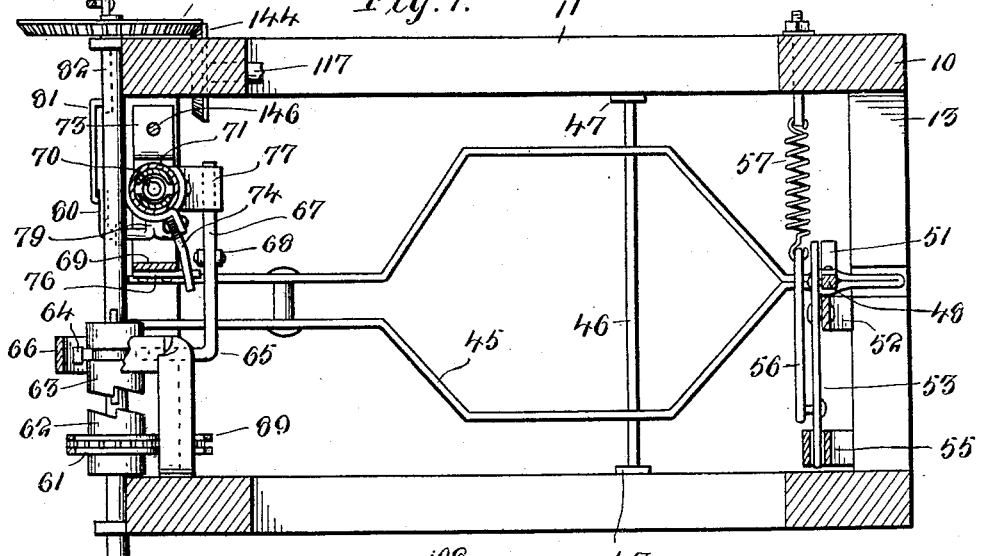
Figure 21:
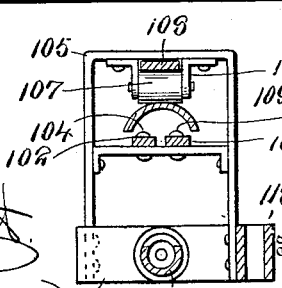

In the drawings: Figure 1 is a side elevation of a machine constructed in accordance with the invention. Fig. 2 is a similar view, looking toward the opposite side of the machine. Fig. 3 is an end elevation, showing the hopper in vertical section. Fig. 4 is an opposite end elevation with the hopper removed. Fig. 5 is a top plan view with the hopper removed. Fig. 6 is a vertical longitudinal sectional view. Fig. 7 is a sectional view on the line 7—7 of Fig. 6. Fig. 8 is a fragmentary vertical sectional view on the line 8—8 of Fig. 5, looking in the direction of the arrow. Fig. 9 is a similar view, taken on the line 9—9, looking in the direction of the arrow. Fig. 10, is a fragmentary detail vertical sectional view through the clamping and tying mechanism of the machine. Fig. 11 is a sectional view on the line 11—11 of Fig. 10. Fig. 12 is a fragmentary vertical sectional view through the jaws of the tying mechanism, showing the jaws closed. Fig. 13 is a similar view, showing the jaws in open position. Fig. 14 is a fragmentary sectional view on the line 14—14 of Fig. 6, looking in the direction of the arrow, and showing the parts in adjusted position. Fig. 15 is a vertical sectional view through the sleeves shown in Fig. 14. Fig. 16 is a fragmentary detail view of the trip device of the weighing mechanism, showing in full lines the normal position and by dotted lines the tripped position. Fig. 17 is a fragmentary side elevation of the bearing for the weighing frame. Fig. 18 is a fragmentary side elevation of the lock device for the dumping arm. Fig. 19 is an enlarged vertical sectional view through the feeding mechanism, showing the differential gearing separated. Fig. 20 is a top plan view of the dumping arm. Fig. 21 is a sectional view on the line $x$—$x$ of Fig. 10.

Similar reference characters indicate corresponding parts throughout the several views in the drawing.

Referring to the drawings in detail, 10 designates the vertical corner posts, 11 the lower side bars, 12 the upper side bars, 13 the lower end cross bars, and 14 the upper end cross bars, which constitute the supporting frame of the machine. Within the frame of the machine and supported by brackets 15 is a dumping platform 16 having arranged on opposite sides thereof shafts 17, the same being journaled in bearings 18 mounted on the corner posts 10 of the frame. The brackets 15 are designed to engage the shafts 17, as shown. Fixed to these shafts are conveyer rollers 19 over which is trained an endless conveyer 20 which is adapted to catch the bag or sack when filled for the delivery thereof from the machine, the conveyer being driven in a manner presently described.

Superimposed upon the frame of the machine is a hopper shaped body 21 in one wall of which is formed a doorway 22 which is adapted to be closed by means of a swinging door 23 hinged or otherwise secured to the body, the doorway 22 being designed to permit the emptying of the material therein to be fed to the bag or sack for the filling thereof. Arranged within the body 21 is a suitable frame having extended transversely through the same a driven shaft 24 to which are keyed or otherwise fixed beveled and cog gears 25 and 26 respectively, of a train or set of transmission gearing, while journaled on a stud axle 27 within the said body 21 is a cog pinion 28 adapted to mesh with the cog gear 26 and the beveled gear 29 of the train or set of gearing, the beveled gear 29 being fixed to the pinion and adapted to be engaged with a vertically movable beveled gear 30 fixed to the upper end of a hollow rotatable agitator shaft 31, while above this gear 30 is a beveled pinion 32 which is fixed to a reversely rotatable agitator shaft 33, the same being extended downwardly through the shaft 31 and has its upper end loosely secured to a yoke 34 which is engaged by and suspended from a coiled retractile spring 35 connected with and hung from the top of the body 21, the spring which pulls upwardly upon the yoke being designed to effect the automatic lifting of the gear 30 and the pinion 32 in mesh with the remaining gears of the said train, when the bag is emptied and is held in the pan or bag holder so that the agitator shafts will be operated for the feeding of the material to the sack or bag to be filled in a manner presently described.

Formed in the body 21 is a funnel-shaped bottom 36 from which projects a feed spout 37, the agitator shafts being extended within the latter and carry agitator wings 38 so that when the material is fed into the body 21 the same will gravitate from the bottom 36 into the spout 37 which has telescoped thereon a feed tube 39 for delivering the material into the sack or bag to be filled. The feed tube 39 is fixed medially with the upper end of a bag holder comprising a frame 40, the lower end of which has fixed thereto a bag or sack receiving pan 41 which is adapted to support the bag or sack when filled. Fixed to the hollow shaft 31 within the body 21 immediately below the gear 30 is a cross bar 42 to which are connected suspension rods 43, the same being extended through the funnel-shaped bottom 36 of the said body and are connected with hooks 44 secured to the upper end of the bag holding frame 40 for suspending it within the frame of the machine. The sack holding frame 40 is connected with weighing mechanism presently described.

The weighing mechanism comprises a rocking balancing frame 45 which is arranged below the dumping platform or the delivery conveyer and is fulcrumed for rocking movement upon a cross fulcrum bar 46 which is mounted in hangers 47 fixed to and depending from the lower side bars 11 of the frame of the machine. Fixed to and depending from the sack holding frame 40 is a bearing standard or rod 48 formed with a socket 49 in its lower end in which is received a pointed bearing stud 50 mounted in one end of the balancing frame 45, the said stud being held within the socket 49 through the medium of a clamp 51 carried by the rod or standard 48 and engaged beneath the end adjacent thereto of the balancing frame 45 of the weighing mechanism. Secured to and rising from one lower cross bar 13 of the frame of the machine is a vertical bracket 52 which is disposed at one side of the standard or rod 48, to which is pivotally connected a rocking lever 53, which has its free end working within a guide 54 mounted in the frame of the machine contiguous to the said bracket 52, the guide 54 being formed with stops 55 against which works the lever 53 to limit the movement thereof and also the vertical movement of the rod or standard 48, which is slidable through the bag holding frame 40. This lever 53 has connected thereto a link 56 which is engaged by one end of a coiled retractile spring 57, the same being also secured to the frame of the machine and is designed to assist in raising the free end of the lever 53, the standard or rod 48 being formed with a pin 58 which engages in a bifurcation 59 in the opposite end of the lever 53, and by the engagement of the pin 58 the lever is rocked against the resistance of the spring 57 on the lifting of the rod or standard 48. It will be seen that when the rod or standard 48 is lowered the lever 53 is tripped, thus relieving the tension upon the spring connected therewith. When the bag holding frame 40 is elevated it acts upon the rod or standard 48, thus raising the same simultaneously therewith, which in turn rocks the lever 53 against the resistance of the spring 57 so that in this manner the pan 41 is held in its raised position until a sack or bag has been filled with a predetermined quantity of material, whence the weight thereof will lower the pan, causing the rocking of the balancing frame 45 which controls the driving mechanism of the machine, which controls the tying mechanism, as will be hereinafter more fully described.

The driving mechanism of the machine comprises a main driving shaft 60 which is journaled in suitable bearings on the frame of the machine above the one end of the balancing frame 45 of the weighing mechanism. Loosely surrounding the main drive shaft 60 is a sprocket wheel 61 having a clutch member 62 integral therewith, while splined or otherwise mounted for longitudinal sliding movement on the shaft for rotation therewith is the companion clutch member 63 which is engaged by a throw fork 64 secured to a rocking trip lever 65 journaled in a bracket 66 fixed to the frame of the machine. The trip end 67 of the said lever 65 has connected thereto a link 68 which is also connected to the balancing frame 45 of the weighing mechanism. The rocking of the balancing frame 45 in one direction lifts the end 67 of the trip lever 65 so as to rock the fork 64 in a direction to move the companion clutch member 63 into engagement with the clutch member 62 on the sprocket wheel 61, thereby locking the latter on the shaft for rotation with the same, the sprocket wheel 61 being connected with and adapted to control the bag clamping and tying mechanism in a manner presently described.

Mounted within the frame of the machine contiguous to the bracket 66 is a bracket 69 supporting a vertical guide post 70, on which are slidably fitted upper and lower sleeves 71 and 72 respectively, the latter sleeve being provided with an L-shaped arm 73, while the sleeve 71 has pivotally connected thereto a trip catch 74, the same being designed to engage in a notch 75 in the sleeve 72 so that both sleeves will be locked together to move upwardly on the post 70 simultaneously with each other. Fixed to the bracket 69 in the path of the trip catch 74 is a trip wing 76 which is adapted to release the catch 74 from its engagement within the notch 75 on the lowering of the sleeve 71 a predetermined distance so as to free the sleeve 72 to permit the further lowering thereof with respect to the sleeve 71 on the post 70. Fixed to the sleeve 71 is an L-shaped trip arm 77, the same being adapted to engage the trip lever 65 during its lowering movement for rocking the fork 64 in a direction to disengage the companion clutch member 63 from the clutch member 62, thereby freeing the sprocket wheel 61 on the driving shaft 60. At one side of the post 70 and journaled in bearings 78 is a catch 79 which is adapted to work in the path of the sleeve 72 for locking it elevated, the catch having an arm 80 to which is connected a link 81, the same being connected to a rocking lever 82 pivoted to the frame of the machine. This rocking lever 82 has connected thereto a connecting rod 83 of a trip arm 84, which is suitably pivoted to the frame of the machine and is adapted to be tripped for throwing the catch 79 at a predetermined interval out of the path of movement of the sleeve 72 to permit the lowering thereof on the post 70, the sleeve 72 being lowered under the action of a coiled retractile spring 85 arranged within the post 70 and connected to the said sleeve.

Journaled in the frame of the machine at a point elevated above the driving shaft 60 is a triple crank shaft 86 to which are fixed beveled and sprocket gears 87 and 88 respectively, the latter having trained thereover an endless sprocket chain 89 which is also trained over the sprocket wheel 61, while the bevel gear 87 is adapted to operate the tying mechanism for the bag or sack when held in the holder, as will be hereinafter fully described.

The tying mechanism comprises a rotatable counter shaft 90 which is journaled in a frame 91, the same being hung from the top of the main frame of the machine through the medium of a spring 92, and is formed with limbs 93 which extend to and are connected with the crank shaft 86 for supporting one end of the said frame 91, the shaft 90 being fitted with a beveled pinion 94 at one end which meshes with the beveled gear 87, while carried at the opposite end of the said shaft 90 is a stationary tying jaw 95, the same coöperating with a swinging tying jaw 96, the latter being pivoted to the stationary jaw 95 and has connected thereto a link 97, the same being pivoted to a slidable rod 98 mounted within the shaft 90, which is of tubular form, the rod 98 being swiveled at its opposite end in a head 99 loosely carried in a double link connection 100, which is engaged with one of the cranks of the shaft 86 so that on the rotation of the latter the movable jaw 96 will open and close with respect to the stationary jaw 95 for the clamping of a staple-like bag tie 101 when embracing the neck of the sack or bag, which is clamped about the feed tube 39 in a manner presently described.

The clamping mechanism for the mouth of the bag comprises a pair of opposed swinging clamping arms 102 carrying at their free ends segmental-shaped clamping jaws 103 which are disposed at opposite sides of the feed tube 39 and are adapted to engage the mouth of the bag for clamping the same about the said tube. The inner ends of the arms 102 are connected by means of pivots 104 to an inverted U-shaped bracket 105 which is fixed to the frame 91, and this bracket supports a bearing 106 provided with a guide roller 107 over which travels a sliding suspension hanger 108 connected to a jaw closing sleeve 109, the major portion of which is of semi-cylindrical shape and is slidably supported in the bracket 105 by the hanger, the sleeve being designed to work against the arms 102 for the opening and closing of the jaws 103 thereon. Connected to the bracket 105 is a coiled retractile spring 110 which is also connected to the sleeve 109 and serves to advance the latter onto the arms 102 for closing the jaws carried thereby. The inner end of the sleeve is formed with an extension 111 slidable in a guide bracket 112 which is fixed to the frame 91, and to this extension 111 is pivotally connected a trip lever 113 which is also pivoted at 114 to a support 115 mounted on the frame 91, the free end of the lever 113 being projected into the path of a trip finger 116 connected to a slide 117 mounted upon a guide rail 118 which is fixed to one of the limbs 93 of the frame 91, the slide 117 having pivoted thereto a throw rod 119 which is loosely connected to one of the double cranks 120 in the shaft 86, while the other double crank has loosely connected thereto a throw rod 121 which is pivoted to a slide 122 mounted upon a guide rail 123 fixed to the main frame of the machine, the said slide 122 serving to operate the tripping device of the bag dumping mechanism presently described.

Swingingly connected to the bracket 112 is a hand operated latch bar 124 formed with a notch 125 in which is engaged a keeper lug 126 projecting upwardly from the suspension hanger 108 on the sleeve 109, and in this manner the latter will be locked against advancing movement on the arms 102 carrying the jaws 103 so as to prevent the closing thereof until the latch bar 124 is released from the lug 126, the bar 124 having its free end projected exteriorly of the frame of the machine to permit manual manipulation thereof.

The bag dumping mechanism comprises a dumping arm 127 which is slidably fitted within a U-shaped bracket 128 fixed to the main frame of the machine, and a cross bridge bar 129 respectively, the bar 129 being secured to the said main frame. Slidably supported upon the bracket 128 in the path of the dumping arm 127 is a latch bolt 130 which is pivotally connected to a trip lever 131, the same being pivoted to the bracket and projects into the path of one of the double cranks 120 so as to be tripped thereby during the rotation of the shaft 86 for releasing the dumping arm 127, the latter being moved in a direction for dumping action by a trip latch 132 which is pivoted to a slide 133 mounted on the guide rail 123 in the path of the slide 122, which moves the slide 133 in a direction to permit the lowering of the latch 132 for its engagement in a notch 134 formed in an extension 135 carried by the dumping arm 127. The slide 133 is formed with arms 136 to which are connected coiled retractile springs 137, the same being also connected to the frame of the machine, and these springs are designed to move the slide on the rail 123 when the latch 132 is engaged with the extension 135 in a direction to move the arm 127 for the dumping of the bag or sack from the pan 41, after the filling of the bag or sack, on to the conveyer so that it may be delivered from the machine. The latch 132 is arranged in the path of movement of a stationary tripping arm 138 fixed to the frame of the machine so that during the movement of the slide 133 a predetermined distance in a direction for actuating the dumping arm 127 the latch 132 will be automatically tripped for its disengagement from the extension 135, and under the action of a coiled retractile spring 139, which is connected to the extension 135 and the frame of the machine, the dumping arm 127 will be automatically returned to normal position, and in this position will be locked by the latch bolt 130 against movement until the said latch bolt is tripped, as hereinbefore described.

It is of course to be understood that the feeding mechanism for the filling of the bag, the weighing mechanism for the predetermined quantity of material fed to the bag, the clamping mechanism for clamping the mouth of the bag about the feed tube, and the tying mechanism for the tying of the mouth of the bag, are timed for successive operations during the continued working of the machine, although the clamping mechanism is capable of being locked to hold the same inactive, and can be manually unlocked for the operation thereof.

Fixed to the shaft 24 for driving the train or set of transmission gearing is a belt wheel 140 over which is trained a cross belt 141, the same being also trained over a belt wheel 142 which is fixed to the main driving shaft 60 so that motion from the latter will be imparted to the said shaft 140 for the continuous driving of a portion of the train or set of transmission gearing, the remaining portion being automatically controlled by the weighing mechanism hereinbefore set forth.

Mounted on the shaft 60 is a gear 143 which meshes with a pinion 144 fixed to one of the shafts 17 carrying a pair of the rollers 19 for the conveyer 20 so that the latter will be driven.

Mounted in the frame of the machine is a spring held locking bolt 145 which is adapted to engage the upper edge of the feed tube 39 for delivering the material to a bag or sack to lock the same in lowered position and the bag holding frame 40 so that the gears 29 and 30 will be disengaged from the remaining gears of the train or set within the body of the hopper thereby preventing the feed of material through the tube 39 to the bag or sack. Pivotally connected to the throw arm 121 at its point of connection with the crank shaft 86 is a pull rod 146, the same being passed through the L-shaped brackets 73 fixed to the sleeve 72 and is formed with a threaded free end 147 on which is adjustably mounted a nut 148, the nut being adapted to engage the bracket 73 for the lifting of the sleeve 72 during the rotation of the shaft 86, whereby the said sleeve 72 when elevated will be locked by the catch 79 which swings into the path thereof, and also this sleeve 72 will be locked with the sleeve 71 through the medium of the catch 74 which engages the sleeve 72 in a manner hereinbefore described.

It is to be understood that normally the machine is at a standstill, that is, the mechanism thereof is inactive. Now, to start the operation of the machine it is first necessary to place a bag within the pan 41 and telescope the mouth of the bag upon the feed tube 39, which is held in lowered position by the bolt 145, which engages therewith. Thereafter, the operator of the machine manipulates the lever 124, which releases the clamping jaws 102, the same moving into clamping relation to the mouth of the bag for clamping the same tightly about the lower end of the feed tube 39, and thereafter the staple 101 is placed about the mouth of the bag so that its limbs will extend between the normally open jaws 95 and 96 of the staple twisting mechanism, which jaws are held in normal open position through the medium of a spring-held dog 149, which is manually released to permit the closing of the jaws onto the limbs of the staple. After this has been accomplished, the operator releases the bolt 145 from its engagement with the feed tube 39 so that the same and the bag holding frame 40 will be automatically raised under the action of the spring 35, whereby the train or set of gearing within the frame in the body 21 will be in meshing relation to each other so that the agitating mechanism will be inactive, the train or set of gears being set in motion through a belt drive. As the bag is filled with material it rests within the pan 41, and as a determined quantity of material is delivered to the bag the weight thereof will cause the lowering of the rod 48, which rocks the scale balancing frame 45, the latter acting upon the trip lever 65, which moves the companion clutch member 63 into engagement with the clutch member 62, thereby locking the sprocket wheel 61 on the shaft 60 so that the twisting and dumping mechanisms will be successively set in action for the twisting of the bag tie and the fastening of the same about the mouth of the bag to close it, and the dumping of the said bag to the conveyer for its delivery from the machine. Subsequent to the operation of the tying mechanism the dumping arm is automatically moved for kicking or dumping the bag from the pan 41 onto the conveyer 20, which delivers it from the machine. During the continued operation of the tying mechanism the scale balancing frame is reset and the clutch member 63 disengaged from the clutch member 62, thus bringing the tying mechanism to a standstill, and the clamping jaws will be automatically thrown to releasing position, it being understood of course that the clamping jaws are released prior to the dumping or kicking of the bag from the pan 41 of the weighing mechanism. Furthermore, the dumping arm, under the action of the spring connected thereto, is thrown to normal position and locked. During the resetting of the scale balancing frame 45 the pan 41 is raised, and the bag holding frame remains lowered, so that the set or train of gearing are out of mesh with each other. The bag holding frame 40 is held in its lowered position by the bolt 145, which engages the feed tube connected with the said frame. On the placing of another bag in the pan 41 and the clamping of its mouth about the feed tube 39 as hereinbefore described, and the placing of the staple 101 about the said mouth of the bag, the frame 40 is released and automatically rises so that the operation of the machine can be repeated. It will be apparent that during the continued operation of the machine the bags placed within the same will be successively filled, the material therein weighed, and the mouth of the bag tied after the filling thereof, and finally the filled bags discharged onto the conveyer for the delivery thereof from the machine. It is of course understood that the bag clamping mechanism can be held against action until released by the latch arm 124 which is manually operated. It will be seen that when the neck or mouth of the bag is clamped to the feed tube 39 and the said bag or sack has been filled, the portion of the latter embraced by the staple-like bag tie 101 will be stretched taut so that the bag tie will be prevented from twisting to any appreciable degree, and the tying jaws will operate upon the tie 101 for the fastening of the same and the tying of the mouth of the bag, the clamping jaws 102 being automatically released after the mouth of the bag has been tied. It will be impossible for the mouth of the bag to slip from the tube 39 when the jaws 102 clamp the said mouth about the latter, so that the tying operation will be successfully effected.

From the foregoing it is thought that the construction and manner of operation of the device will be clearly understood, and therefore a more extended explanation has been omitted.

What is claimed is:

1. A machine of the class described comprising a frame, a feed hopper supported thereby, bag holding mechanism, weighing mechanism operative by the bag holding mechanism, bag clamping mechanism, bag tie twisting mechanism, means controlled by the weighing mechanism for successively operating the bag clamping and tying mechanisms, a bag conveyer adapted to receive a bag from the bag holding mechanism when the said bag has been filled with material, means controlled by the bag clamping mechanism for dumping the bag from the bag holding mechanism onto the conveyer, and driving means for feeding material from the hopper to a bag and controlled by the bag holding mechanism.

2. A machine of the class described comprising a frame, a feed hopper supported thereby, bag holding mechanism, weighing mechanism operative by the bag holding mechanism, bag clamping mechanism, bag tie twisting mechanism, means controlled by the weighing mechanism for successively operating the bag clamping and tying mechanisms, a bag conveyer adapted to receive a bag from the bag holding mechanism when the said bag has been filled with material, means controlled by the bag clamping mechanism for dumping the bag from the bag holding mechanism onto the conveyer, driving means for feeding material from the hopper to a bag and controlled by the bag holding mechanism, and means mounted in the frame and engageable with the bag holding mechanism to lock the same against movement to prevent the operation of the feeding mechanism.

3. A machine of the class described comprising a frame, a feed hopper supported thereby, bag holding mechanism, weighing mechanism operative by the bag holding mechanism, bag clamping mechanism, bag tie twisting mechanism, means controlled by the weighing mechanism for successively operating the bag clamping and tying mechanisms, a bag conveyer adapted to receive a bag from the bag holding mechanism when the said bag has been filled with material, means controlled by the bag clamping mechanism for dumping the bag from the bag holding mechanism onto the conveyer, driving means for feeding material from the hopper to a bag and controlled by the bag holding mechanism, means mounted in the frame and engageable with the bag holding mechanism to lock the same against movement to prevent the operation of the feeding mechanism, and mechanism for resetting the weighing mechanism and actuated by the bag clamping mechanism.

4. A machine of the class described comprising a frame, a feed hopper supported thereby, bag holding mechanism, weighing mechanism operative by the bag holding mechanism, bag clamping mechanism, bag tie twisting mechanism, means controlled by the weighing mechanism for successively operating the bag clamping and tying mechanisms, a bag conveyer adapted to receive a bag from the bag holding mechanism when the said bag has been filled with material, means controlled by the bag clamping mechanism for dumping the bag from the bag holding mechanism onto the conveyer, driving means for feeding material from the hopper to a bag and controlled by the bag holding mechanism, means mounted in the frame and engageable with the bag holding mechanism to lock the same against movement to prevent the operation of the feeding mechanism, mechanism for resetting the weighing mechanism and actuated by the bag clamping mechanism, and means engaged with the dumping mechanism for normally holding the same against movement and controlled by the bag clamping mechanism.

5. In a machine of the class described, a frame, a conveyer arranged within the frame, driving mechanism operating the conveyer, a feed hopper supported by the frame, feeding mechanism arranged within the hopper, bag holding mechanism for controlling the working of the feeding mechanism, connections between the said conveyer driving mechanism and the feeding mechanism imparting motion thereto, bag weighing mechanism operated by the bag holding mechanism, and means for dumping the bag from the bag holding mechanism after the filling thereof onto the conveyer.

6. In a machine of the class described, a frame, a conveyer arranged within the frame, driving mechanism operating the conveyer, a feed hopper supported by the frame, feeding mechanism arranged within the hopper, bag holding mechanism controlling the working of the feeding mechanism, connections between the said conveyer driving mechanism and the feeding mechanism imparting motion thereto, bag weighing mechanism operated by the bag holding mechanism, means for dumping the bag from the bag holding mechanism after the filling thereof onto the conveyer, and means for clamping the bag during the filling operation.

7. In a machine of the class described, a frame, a conveyer arranged within the frame, driving mechanism operating the conveyer, a feed hopper supported by the frame, feeding mechanism arranged within the hopper, bag holding mechanism for controlling the working of the feeding mechanism, connections between the said conveyer driving mechanism and the feeding mechanism imparting motion thereto, bag weighing mechanism operated by the bag holding mechanism, means for dumping the bag from the bag holding mechanism after the filling thereof onto the conveyer, means for clamping the bag during the filling operation, and bag tying mechanism for the closing of a bag and controlled by the bag clamping mechanism.

8. In a machine of the class described, a frame, a conveyer arranged within the frame, driving mechanism operating the conveyer, a feed hopper supported by the frame, feeding mechanism arranged within the hopper, bag holding mechanism for controlling the working of the feeding mechanism, connections between the said conveyer driving mechanism and the feeding mechanism imparting motion thereto, bag weighing mechanism operated by the bag holding mechanism, means for dumping the bag from the bag holding mechanism after the filling thereof onto the conveyer, means for clamping the bag during the filling operation, bag tying mechanism for the closing of a bag and controlled by the bag clamping mechanism, and mechanism for stopping the action of the bag clamping and tying mechanism on the resetting of the weighing mechanism.

9. In a machine of the class described, a frame, a conveyer arranged within the frame, driving mechanism operating the conveyer, a feed hopper supported by the frame, feeding mechanism arranged within the hopper, bag holding mechanism for controlling the working of the feeding mechanism, connections between the said conveyer driving mechanism and the feeding mechanism imparting motion thereto, bag weighing mechanism operated by the bag holding mechanism, means for dumping the bag from the bag holding mechanism after the filling thereof onto the conveyer, means for clamping the bag during the filling operation, bag tying mechanism for the closing of a bag and controlled by the bag clamping mechanism, mechanism for stopping the action of the bag clamping and tying mechanism on the resetting of the weighing mechanism, and mechanism for resetting the weighing mechanism and actuated by the bag clamping and tying mechanism.

10. In a machine of the class described, a frame, a conveyer arranged within the frame, driving mechanism operating the conveyer, a feed hopper supported by the frame, feeding mechanism arranged within the hopper, bag holding mechanism for controlling the working of the feeding mechanism, connections between the said conveyer driving mechanism and the feeding mechanism imparting motion thereto, bag weighing mechanism operated by the bag holding mechanism, means for dumping the bag from the bag holding mechanism after the filling thereof onto the conveyer, means for clamping the bag during the filling operation, bag tying mechanism for the closing of a bag and controlled by the bag clamping mechanism, mechanism for stopping the action of the bag clamping and tying mechanism on the resetting of the weighing mechanism, mechanism for resetting the weighing mechanism and actuated by the bag clamping and tying mechanism, and means for resetting the bag dumping means.

11. In a machine of the class described, a frame, a conveyer arranged within the frame, driving mechanism operating the conveyer, a feed hopper supported by the frame, feeding mechanism arranged within the hopper, bag holding mechanism for controlling the working of the feeding mechanism, connections between the said conveyer driving mechanism and the feeding mechanism imparting motion thereto, bag weighing mechanism operated by the bag holding mechanism, means for dumping the bag from the bag holding mechanism after the filling thereof onto the conveyer, means for clamping the bag during the filling operation, bag tying mechanism for the closing of a bag and controlled by the bag clamping mechanism, mechanism for stopping the action of the bag clamping and tying mechanism on the resetting of the weighing mechanism, mechanism for resetting the weighing mechanism and actuated by the bag clamping and tying mechanism, means for resetting the bag dumping means, and means for locking the bag dumping means in normal position and released by the bag clamping mechanism.

12. In a machine of the class described, a frame, a conveyer arranged within the frame, driving mechanism operating the conveyer, a feed hopper supported by the frame, feeding mechanism arranged within the hopper, bag holding mechanism for controlling the working of the feeding mechanism, connections between the said conveyer driving mechanism and the feeding mechanism imparting motion thereto, bag weighing mechanism operated by the bag holding mechanism, means for dumping the bag from the bag holding mechanism after the filling thereof onto the conveyer, means for clamping the bag during the filling operation, bag tying mechanism for the closing of a bag and controlled by the bag clamping mechanism, mechanism for stopping the action of the bag clamping and tying mechanism on the resetting of the weighing mechanism, mechanism for resetting the weighing mechanism and actuated by the bag clamping and tying mechanism, means for resetting the bag dumping means, means for locking the bag dumping means in normal position and released by the bag clamping mechanism, and means for automatically resetting the bag holding means and simultaneously setting in action the bag feeding mechanism.

13. In a machine of the class described, a frame, a conveyer arranged within the frame, driving mechanism operating the conveyer, a feed hopper supported by the frame, feeding mechanism arranged within the hopper, bag holding mechanism for controlling the working of the feeding mechanism, connections between the said conveyer driving mechanism and the feeding mechanism imparting motion thereto, bag weighing mechanism operated by the bag holding mechanism, means for dumping the bag from the bag holding mechanism after the filling thereof onto the conveyer, means for clamping the bag during the filling operation, bag tying mechanism for the closing of a bag, and controlled by the bag clamping mechanism, mechanism for stopping the action of the bag clamping and tying mechanism on the resetting of the weighing mechanism, mechanism for resetting the weighing mechanism and actuated by the bag clamping and tying mechanism, means for resetting the bag dumping means, means for locking the bag dumping means, means for locking the bag dumping means in normal position and released by the bag clamping mechanism, means for automatically resetting the bag holding means and simultaneously setting in action the bag feeding mechanism, and means for locking the bag holding mechanism inactive.

14. In a machine of the class described, a frame, a conveyer arranged within the frame, driving mechanism operating the conveyer, a feed hopper supported by the frame, feeding mechanism arranged within the hopper, bag holding mechanism for controlling the working of the feeding mechanism, connections between the driving means and the feeding mechanism imparting motion thereto, bag weighing mechanism operated by the bag holding mechanism, means for dumping the bag from the bag holding mechanism after the filling thereof onto the conveyer, means for clamping the bag during the filling operation, bag tying mechanism for the closing of a bag and controlled by the bag clamping mechanism, mechanism for stopping the action of the bag clamping and tying mechanism on the resetting of the weighing mechanism, mechanism for resetting the weighing mechanism and actuated by the bag clamping and tying mechanism, means for resetting the bag dumping means, means for locking the bag dumping means in normal position and released by the bag clamping mechanism, means for automatically resetting the bag holding means and simultaneously setting in action the bag feeding mechanism, means for locking the bag holding mechanism inactive, and manually controlled means for locking the bag clamping mechanism against action.

In testimony whereof I affix my signature in presence of two witnesses.

FRANK GRIFFEN.

Witnesses:
F. W. READING,
H. L. CLINTON.

Copies of this patent may be obtained for five cents each, by addressing the "Commissioner of Patents, Washington, D. C."